US010206124B1

(12) United States Patent
Govindassamy

(10) Patent No.: US 10,206,124 B1
(45) Date of Patent: Feb. 12, 2019

(54) METHOD AND APPARATUS FOR BIDIRECTIONAL MODEM

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 204 days.

(21) Appl. No.: 15/264,788

(22) Filed: Sep. 14, 2016

(51) Int. Cl.
*H04W 4/00* (2018.01)
*H04W 24/02* (2009.01)
*H04W 72/04* (2009.01)
*H04W 72/08* (2009.01)
H04W 88/06 (2009.01)

(52) U.S. Cl.
CPC ....... *H04W 24/02* (2013.01); *H04W 72/0406* (2013.01); *H04W 72/087* (2013.01); *H04W 88/06* (2013.01)

(58) Field of Classification Search
CPC ............. H04W 24/02; H04W 72/0406; H04W 72/087; H04W 88/06
See application file for complete search history.

(56) References Cited

U.S. PATENT DOCUMENTS

| 6,285,892 | B1 * | 9/2001 | Hulyalkar | H04Q 11/0478 455/574 |
|---|---|---|---|---|
| 6,980,533 | B1 * | 12/2005 | Abraham | H04W 72/1257 370/329 |
| 8,345,645 | B2 * | 1/2013 | Kuc | H04W 52/0219 370/338 |
| 8,654,778 | B2 * | 2/2014 | Yamada | H04W 40/005 370/311 |
| 9,001,720 | B2 * | 4/2015 | Wentink | H04W 52/0216 370/311 |
| 9,338,748 | B2 * | 5/2016 | Wang | H04W 4/70 |
| 9,367,113 | B2 * | 6/2016 | Attar | H04W 52/0245 |
| 9,646,607 | B2 * | 5/2017 | Nix | G10L 15/08 |
| 2007/0230400 | A1 * | 10/2007 | Kuchibhotla | H04W 52/0216 370/331 |
| 2007/0260830 | A1 * | 11/2007 | Faibish | G06F 3/061 711/162 |
| 2008/0102880 | A1 | 5/2008 | Gholmieh et al. | |
| 2009/0054006 | A1 | 2/2009 | Cai et al. | |

(Continued)

Primary Examiner — Stephen M D Agosta
(74) Attorney, Agent, or Firm — Lerner, David, Littenberg, Krumholz & Mentlik, LLP

(57) ABSTRACT

Many applications used in communication systems involve bidirectional data transfer. In bidirectional data transfer applications, a client terminal has to turn on its hardware components such as transmitter at the time of transmitting the data and the receiver at the time of receiving the data. When the transmission and reception of data happens at different time instances, the client terminal has to turn on and off the transmitter, the receiver and other modules at separate time instances. This may lead to increased power consumption. A method and apparatus are disclosed for the modem in a client terminal that bring the transmission and the reception instances close to each other or overlap with each other when performing bidirectional communication. This may reduce the rate at which the client terminal has to turn on and off its transmitter, receiver and other modules which may in turn reduce its power consumption.

23 Claims, 18 Drawing Sheets

(56) References Cited

U.S. PATENT DOCUMENTS

| | | | | |
|---|---|---|---|---|
| 2010/0046543 A1* | 2/2010 | Parnaby | ............... | H04L 12/12 |
| | | | | 370/465 |
| 2010/0111523 A1* | 5/2010 | Hirth | ............... | H04B 10/27 |
| | | | | 398/25 |
| 2010/0128645 A1* | 5/2010 | Lin | ............... | H04W 52/0251 |
| | | | | 370/311 |
| 2010/0138549 A1* | 6/2010 | Goel | ............... | H04W 52/0225 |
| | | | | 709/228 |
| 2013/0142049 A1* | 6/2013 | Jim | ............... | H04W 52/0225 |
| | | | | 370/241 |
| 2015/0305056 A1 | 10/2015 | Vangala et al. | | |
| 2016/0286599 A1 | 9/2016 | Weingertner et al. | | |
| 2017/0251519 A1 | 8/2017 | Ohlsson et al. | | |

\* cited by examiner

PRIOR ART

PRIOR ART

PRIOR ART

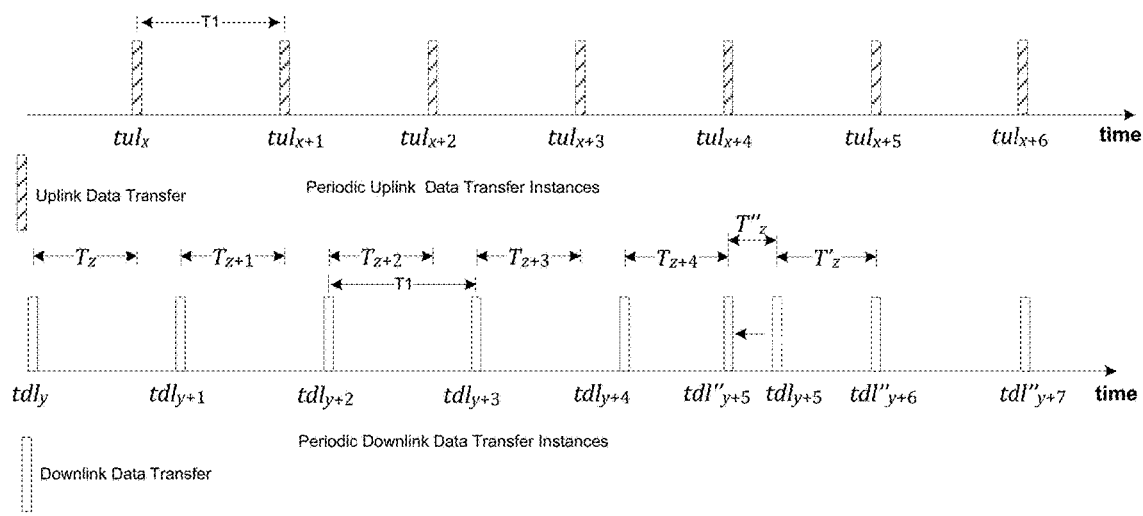

METHOD AND APPARATUS FOR BIDIRECTIONAL MODEM

CROSS REFERENCE TO RELATED APPLICATIONS

This application is related to U.S. patent application Ser. No. 15/270,785, filed Sep. 20, 2016, the disclosure of which is hereby incorporated herein by reference.

BACKGROUND

A communication system normally comprises a network entity which provides services and the client terminals which use the services. The network entity, such as a base station, is referred to herein as a Server and the client terminals are referred herein as Clients. In the present disclosure, the terms Clients, client terminals, and client devices are used interchangeably. Also the terms Server, Network and network entity are used interchangeably.

FIG. 1 shows the data transfer that takes place between a Server and a Client after establishing communication paths between the two entities. As illustrated, the communication path from the Server to the Client is referred to herein as "downlink" and the communication path from the Client to the Server is referred to herein as "uplink." In the downlink the Server transmits the data and the Client receives the data and this is referred to herein as "downlink data transfer." In the uplink the Client transmits the data and the Server receives the data and this is referred to herein as "uplink data transfer."

The data exchanged between a Server and a Client may be normally classified into two types: (i) control messages, which control the functional behavior of both the Server and the Client and facilitate the change of the attributes of the communication path; and (ii) payload data which is the user data. The control messages may be normally used to setup, maintain, and release the communication path for data transfer between the Server and the Client. A communication path between the Server and the Client is also referred to herein as a "connection."

Normally an application is an entity that uses the connections between the Client and the Server to transfer user payload data as illustrated in FIG. 2. For example an internet browser is an application which may use any type of communication system that may establish the connections to enable this application to transfer user payload data. Examples of such communication systems include Digital Subscriber Line (DSL), Cable Modem, and Wireless Local Area Network (WLAN) which is commonly known as Wi-Fi. The $3^{rd}$ Generation Partnership Project (3GPP) based wireless communication systems such as Long Term Evolution (LTE), Wideband Code Division Multiple Access (WCDMA), Global System for Mobile Communications (GSM), General Packet Radio Services (GPRS), Enhanced Data rates for GSM Evolution (EDGE), Code division Multiple Access (CDMA), etc., may also be used as communication systems.

In many applications, the uplink data transfer and the downlink data transfer are not continuous. For example in voice applications, the user's voice is digitized, buffered, processed and then transferred as a payload data. The payload data may be transferred in bursts. In some cases, the burst of data may be transferred at periodic intervals.

Often the Clients and the Server communicate over wireless media. In these wireless communication systems the Clients are often handheld battery operated devices. Hence it is important for the Clients to operate in a power efficient manner To reduce power consumption, a client terminal may turn off most of its hardware and software modules when there is no data transfer expected either in the uplink or in the downlink or both in the uplink and downlink directions.

The state in which the client terminal turns off most of its hardware and software modules is referred to herein as "sleep state." The state in which the client terminal is involved in uplink data transfer or downlink data transfer or both is referred to herein as "active state." To reduce power consumption in a client terminal, it may be desirable to operate the client terminal in the sleep state as much as possible while performing data transfer required by the application.

The transition from sleep state to active state of the client terminal is referred herein as "wake-up" state. The transition from active state to sleep state of the client terminal is referred herein as "entering-sleep" state. The client terminal may transition from sleep state to active state for either uplink data transfer or downlink data transfer or both. Some hardware and software modules in a client terminal may be specific to uplink or specific to downlink that can be independently turned on or turned off based on uplink or downlink data transfer requirement. Some hardware and software modules in a client terminal may be common for both uplink data transfer and downlink data transfer and may have to be turned on whenever either uplink data transfer or downlink data transfer is in progress.

The wake-up state and the entering-sleep state have the overhead in power consumption. Normally the power consumption is higher during both the wake-up state and the entering-sleep state when compared to that of the sleep state but lower when compared to that of the active state. Typically the transition time for the wake-up state is longer than the transition time for the entering-sleep state. Also in general the power consumption during the wake-up state is higher than that during the entering-sleep sate. An example of various state transitions is illustrated in FIG. 3. As and when appropriate, a client terminal may enter into sleep state and active state as illustrated in FIG. 4. For the remainder of the present disclosure, the wake-up state and the entering-sleep state may not be explicitly mentioned or shown in the drawings but they are always present.

In many communication systems, resources such as channel bandwidth may be shared by a large number of Clients to communicate with the Server. Generally different methods may be used for resource allocation. In some allocation methods the resources may be allocated at the beginning of a connection between the Client and the Server and generally not altered through the rest of the duration of the connection. In some other allocation methods the resources may be allocated at the beginning of the connection between the Client and the Server and may be altered during the duration of the connection.

Although there may be some coordination between the uplink and the downlink at the application level, in some communication systems the uplink and downlink connections may be established using separate resource allocations. In such cases there is no explicit coordination between the uplink connection and the downlink connection. The data transfer between the Server and the Client for the uplink and the downlink generally may happen at different time instances and it may not necessarily be periodic as shown in FIG. 5. For such scenarios a Client may have to separately enter into active state for the uplink data transfer and for the down link data transfer as shown in FIG. 5. This may lead to increased power consumption in the client terminals, which is a significant disadvantage for battery operated client terminals.

For some applications the uplink data transfer and the downlink data transfer may occur at periodic intervals but at different instances as shown in FIG. 6. The time interval between two consecutive uplink data transfer and between two consecutive downlink data transfer may be the same and denoted by T1. To support such applications, a client terminal may have to enter active state for the uplink data transfer and for the downlink data transfer separately as shown in FIG. 6. This may lead to increased power consumption in a client terminal, which is a significant disadvantage for a battery operated client terminals.

SUMMARY

A method and apparatus are disclosed that bring the transmission and the reception instances close to each other or overlap with each other when a client terminal is engaged in a bidirectional communication. This may reduce the rate at which the client terminal may have to turn on and off its transmitter, receiver and other modules which may in turn reduce the power consumption of a client terminal.

In accordance with an aspect of the present disclosure, a method for resource allocation between a server and a client device in a wireless communication system may include controlling, by at least one processing device of at least one of the server or the client device, monitoring uplink data transfer and downlink data transfer between the server and client device; and uplink data transfer instances and downlink data transfer instances to take place respectively in single active states of the client device, based on the monitoring.

In one alternative, the at least one processing device may be of the server and control the monitoring of the uplink data transfer and the downlink data transfer, and uplink data transfer timing and downlink data transfer timing for n uplink data transfer and downlink data transfer instances may be monitored during the monitoring, and the method may further include: controlling, by the at least one processing device, determining a time difference, $T_z$, between every downlink data transfer and uplink data transfer instance pair of the n uplink and downlink data transfer instances, wherein $T_z=|tdl_y-tul_x|$, $tdl_y$ is a given downlink data transfer instance of the n downlink data transfer instances and $tul_x$ is a given uplink data transfer instance of the n uplink data transfer instances; determining a mean time difference, $T'_z$, from the time differences $T_z$, $T_{z+1}$, $T_{z+2}$, ..., $T_{z+n-1}$; determining whether the individual time differences $T_z$, $T_{z+1}$, $T_{z+2}$, ..., $T_{z+n-1}$ are approximately the same as the mean time difference $T'_z$, based on whether the individual time differences are within a predetermined threshold C1 of the mean time difference $T'_z$; when a periodic downlink data transfer and uplink data transfer is determined, determining a difference, $T''_z$, between a time duration between two consecutive uplink data transfer instances and two consecutive downlink data transfer instances, T1, and $T'_z$, where $T''_z=|T1-T'_z|$, when $T'_z<T''_z$, delaying a downlink data transfer instance at $tdl_{y+n}$ to a downlink data transfer instance at $tdl'_{y+n}$, wherein $tdl'_{y+n}=(tdl_{y+n}+T'_z)$, and when $T'_z \geq T''_z$ and (i) when the downlink data transfer instance at $tdl_{y+n}$ is determined to be advanceable to a downlink data transfer instance at $tdl''_{y+n}$, wherein $tdl''_{y+n}=(tdl_{y+n}-T''_z)$, advancing the downlink data transfer instance at $tdl_{y+n}$ to the downlink data transfer instance at $tdl''_{y+n}$, and (ii) when the downlink data transfer instance at $tdl_{y+n}$ is determined not to be advanceable to the downlink data transfer instance at $tdl''_{y+n}$, delaying the downlink data transfer instance at $tdl_{y+n}$ to the downlink data transfer instance at $tdl'_{y+n}$.

In one alternative, the delaying the downlink data transfer instance at $tdl_{y+n}$ may include sending a message request to the client device indicating that timing of the downlink data transfer instances may be aligned close to, or overlap with, the uplink data transfer instances of the client device, and based on a response of an acknowledgement from the client device being received at the Server, starting from the downlink data transfer instance at $tdl'_{y+n}$ allocating all subsequent downlink data transfer instances at time interval T1 relative to $tdl'_{y+n}$.

In one alternative, n may be equal to five.

In one alternative, whether the downlink data transfer instance at $tdl_{y+n}$ is determined to be advanceable to the downlink data transfer instance at $tdl''_{y+n}$ may be based on a Quality of Service (QoS) parameter of at least one of delay, jitter or latency.

In one alternative, n may be determined based on at least one of simulation or field data analysis.

In one alternative, the at least one processing device may be of the client device and control the monitoring of the uplink data transfer and the downlink data transfer, and uplink data transfer timing and downlink data transfer timing for n uplink data transfer and downlink data transfer instances may be monitored during the monitoring, and the method may further include controlling, by the at least one processing device, determining a time difference, $T_z$, between every downlink data transfer and uplink data transfer instance pair of the n uplink and downlink data transfer instances, wherein $T_z=|tdl_y-tul_x|$, $tdl_y$ is a given downlink data transfer instance of the n downlink data transfer instances and $tul_x$ is a given uplink data transfer instance of the n uplink data transfer instances; determining a mean time difference, $T'_z$, from the time differences $T_z$, $T_{z+1}$, $T_{z+2}$, ..., $T_{z+n-1}$; determining that the individual time differences $T_z$, $T_{z+1}$, $T_{z+2}$, ..., $T_{z+n-1}$ are approximately the same as the mean time difference $T'_z$, when the individual time differences are within a predetermined threshold C1 of the mean time difference $T'_z$; when a periodic downlink data transfer and uplink data transfer is determined, determining a difference, $T''_z$, between a time duration between two consecutive uplink data transfer instances and two consecutive downlink data transfer instances, T1, and $T'_z$, where $T''_z=|T1-T'_z|$, when $T'_z<T''_z$, delaying an uplink data transfer instance at $tul_{y+n}$ to an uplink data transfer instance $tul'_{y+n}$ where $tul'_{y+n}=(tul_{y+n}+T'_z)$, and when $T'_z \geq T''_z$ and (i) when the uplink data transfer instance at $tul_{y+n}$ is determined to be advanceable to an uplink data transfer instance at $tul''_{y+n}$, wherein $tul''_{y+n}=(tul_{y+n}-T''_z)$, requesting the server to advance the uplink data transfer instance at $tul_{y+n}$ to the uplink data transfer instance at $tul''_{y+n}$, and (ii) when the uplink data transfer instance at $tul_{y+n}$ is determined not to be advanceable to the uplink data transfer instance at $tul''_{y+n}$, requesting the server to delay the uplink data transfer instance at $tul_{y+n}$ to the uplink data transfer instance at $tul'_{y+n}$.

In one alternative, the delaying the uplink data transfer instance at $tul_{y+n}$ may include sending a message request to the server indicating that timing of the downlink data transfer instances may be aligned close to, or overlap with, the uplink data transfer instances of the server, and based on a response of an acknowledgement from the server being received at the client device, starting from the uplink data transfer instance at $tul'_{y+n}$ allocating all subsequent uplink data transfer instances at time interval T1 relative to $tul'_{y+n}$.

In one alternative, whether the uplink data transfer instance at $tdl_{y+n}$ is determined to be advanceable to the uplink data transfer instance at $tul_{y+n}$ may be based on a Quality of Service (QoS) parameter of at least one of delay, jitter or latency.

In one alternative, the at least one processing device may be of the client device and control the monitoring of the uplink data transfer and the downlink data transfer, uplink data transfer timing and downlink data transfer timing for n uplink data transfer and downlink data transfer instances may be monitored during the monitoring, and the method may include, when the client device is determined to have uplink a transmission resource available all the time, controlling by the at least one processing device autonomously delaying or advancing the uplink data transfer instances to be aligned with corresponding ones of the downlink data transfer instances without communication with the server.

In one alternative, a first processing device of the client device and a second processing device of the server may control the monitoring of the uplink data transfer and the downlink data transfer, uplink data transfer timing and downlink data transfer timing for n uplink data transfer and downlink data transfer instances may be monitored during the monitoring, and at least one of the first and second processing devices may control a resource re-allocation process to move at least one of given uplink data transfer instances or given downlink data transfer instances close to each other or to overlap with each other.

In one alternative, the given uplink data transfer instances and the given downlink data transfer instances may be moved such that the given uplink data transfer instances are close to the given downlink data transfer instances or overlap with the given downlink data transfer instances and latency is minimized on both an uplink path and a downlink path.

In one alternative, the resource re-allocation process may be based on an associated Quality of service (QoS) requirement of data transfer, according to a QoS parameter of at least one of delay, jitter or latency.

In one alternative, the method may include controlling, by at least one of the first and second processing devices, deciding whether to advance or delay timing of the given data transfer instances based on a criterion of minimizing delay.

In one alternative, the method may include controlling, by the at least one processing device, when the uplink data transfer and the downlink data transfer is determined to be not periodic or an uplink data transfer period is determined to be different from a downlink data transfer period, a subset of the uplink and downlink data transfer instances to move close to each other or overlap with each other by adaptation of resource allocation.

In one alternative, the method may include controlling, by the at least one processing device, when a non-periodic data transfer is determined, after the uplink data transfer and the downlink data transfer are controlled to be aligned close to each other or overlapped with each other, monitoring the uplink data transfer and the downlink data transfer instances and periodically reevaluating whether to continue alignment or allow the uplink data transfer and the downlink data transfer instances to be independent.

In one alternative, a decision whether to continue the alignment or allow the uplink data transfer and the downlink data transfer instances to be independent may be based on Quality of Service (QoS) criteria including at least one of latency or jitter.

In one alternative, the decision whether to continue the alignment of uplink data transfer and the downlink data transfer instances may be made after applying hysteresis to at least one metric used in the decision making In accordance with an aspect of the present disclosure, an apparatus for resource allocation between a server and a client device in a wireless communication system may include circuitry configured to control monitoring uplink data transfer and downlink data transfer between the server and client device; and uplink data transfer instances and downlink data transfer instances to take place respectively in single active states of the client device, based on the monitoring.

In accordance with an aspect of the present disclosure, a wireless communication device may include a receiver to receive a wireless communication; and a processing device configured for resource allocation between a server and a client device in a wireless communication system. The processing device may be configured to control monitoring uplink data transfer and downlink data transfer between the server and client device; and uplink data transfer instances and downlink data transfer instances to take place respectively in single active states of the client device, based on the monitoring.

BRIEF DESCRIPTION OF THE DRAWINGS

FIG. 7C illustrates advancing of the downlink data transfer instances to overlap with uplink data transfer instances according to the aspects of the present disclosure.

DETAILED DESCRIPTION

Figure 1:
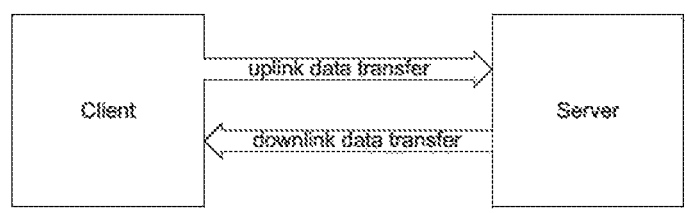
FIG. 1 illustrates a Client and a Sever communicating over the uplink and downlink for data transfer.
Figure 2:
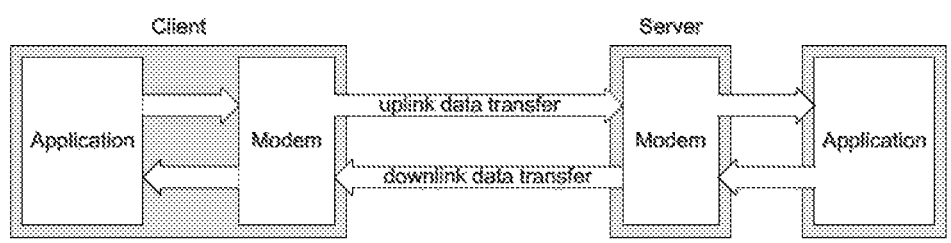
FIG. 2 illustrates an Application and a Modem as separate modules within a Client and a Server.
Figure 3:
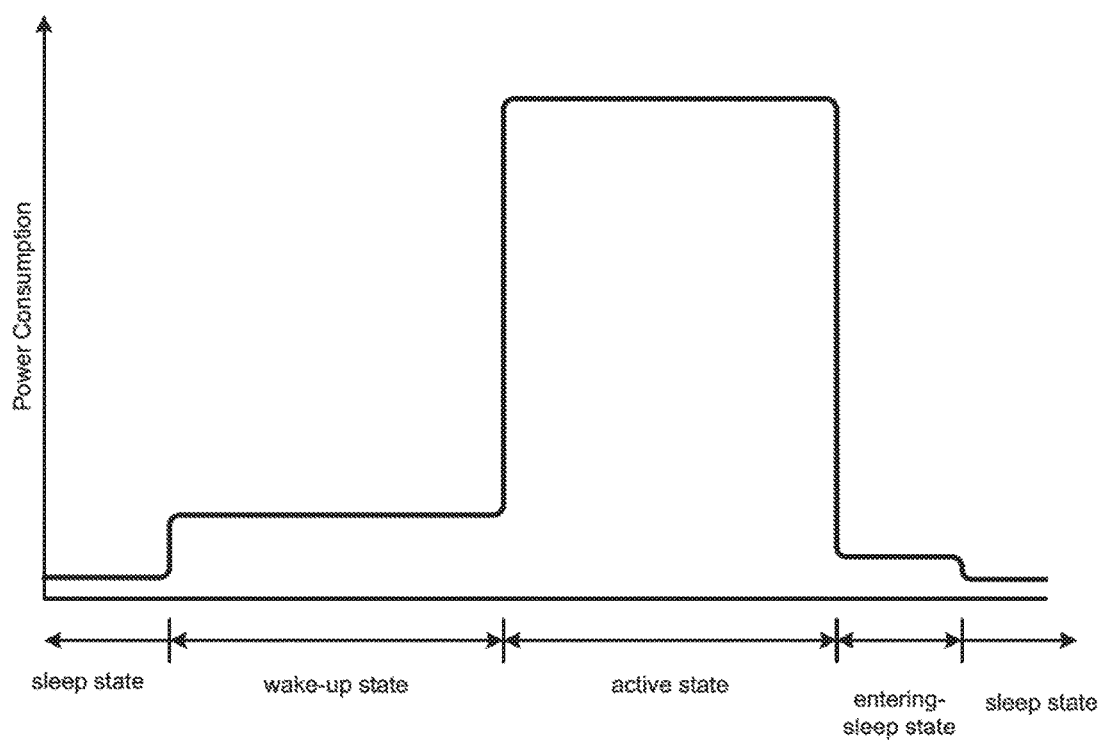
FIG. 3 illustrates a sleep state, wake-up state, active state and entering-sleep state in a client terminal.
Figure 4:
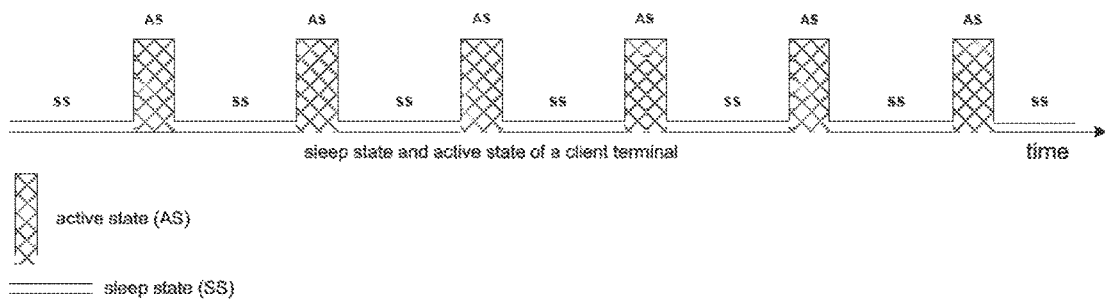
FIG. 4 illustrates a client terminal entering and exiting sleep state and active state.
Figure 5:
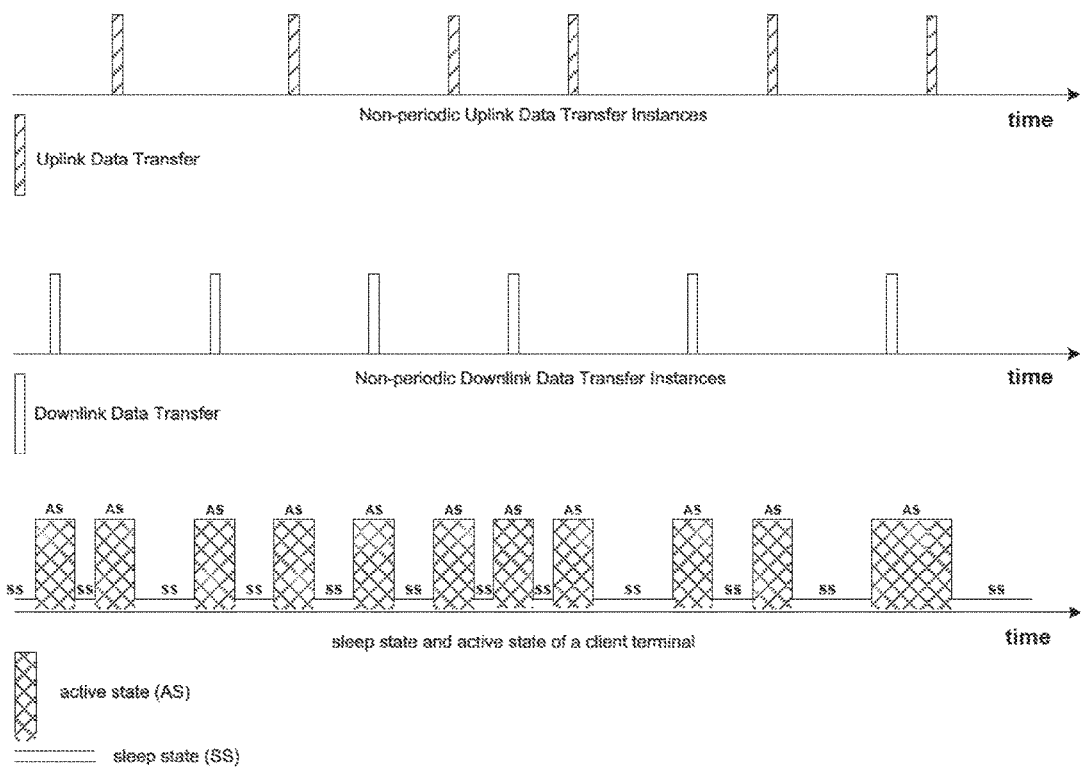
FIG. 5 illustrates separate uplink and downlink non-periodic data transfer instances and a corresponding sleep state and active state in a client terminal.

The foregoing aspects, features and advantages of the present disclosure will be further appreciated when considered with reference to the following description of preferred embodiments and accompanying drawings, wherein like reference numerals represent like elements. In describing the preferred embodiments of the disclosure illustrated in the appended drawings, specific terminology will be used for the sake of clarity. However, the disclosure is not intended to be limited to the specific terms used.

According to an aspect of the present disclosure, the resource allocation between the Server and the Client may be such that the uplink data transfer instances and the downlink data transfer instances may be brought close to each other or may be overlapped so that both uplink data transfer and downlink data transfer may take place in a single active state of the client terminal. This may lead to reduction in the number of times client terminal transitions from sleep state to active state and active state to sleep state and may reduce the amount of time spent by the Client Terminal in the active state. The adaptation of resource allocation between the Server and the Client may be performed based on the following methods.

Method 1: According to an aspect of the present disclosure, a Server may monitor the uplink data transfer timing and the downlink data transfer timing for n uplink data transfer and downlink data transfer instances. The uplink data transfer instances herein are referred to as $tul_x$, $tul_{x+1}$, $tul_{x+2}$, ..., $tul_{x+n-1}$. The downlink data transfer instances herein are referred to as $tdl_y$, $tdl_{y+1}$, $tdl_{y+2}$, ..., $tdl_{y+n-1}$. According to an aspect of the present disclosure, the Server may calculate the time difference between every downlink data transfer and uplink data transfer instance pairs using EQ. (1):

$$T_z = |tdl_y - tul_x| \qquad \text{EQ. (1)}$$

According to an aspect of the present disclosure, the Server may calculate $T_z$, $T_{z+1}$, $T_{z+2}$, ..., $T_{z+n-1}$, using EQ. (1) for all n downlink and uplink instance pairs. According to an aspect of the present disclosure, the Server may estimate the mean time difference $T'_z$ from the calculated time differences $T_z$, $T_{z+1}$, $T_{z+2}$, ..., $T_{z+n-1}$. According to an aspect of the present disclosure, the Server may determine that the individual time differences $T_z$, $T_{z+1}$, $T_{z+2}$, ..., $T_{z+n-1}$ are approximately the same as that of the mean value $T'_z$ if the individual time differences are within a configurable threshold C1 of the mean value.

For a periodic downlink data transfer and uplink data transfer, let T1 denote the time duration between two consecutive uplink data transfer instances and two consecutive downlink data transfer instances. According to an aspect of the present disclosure, the Server may calculate difference between T1 and $T'_z$ using EQ. (2):

$$T''_z = |T1 - T'_z| \qquad \text{EQ. (2)}$$

Figure 7A:
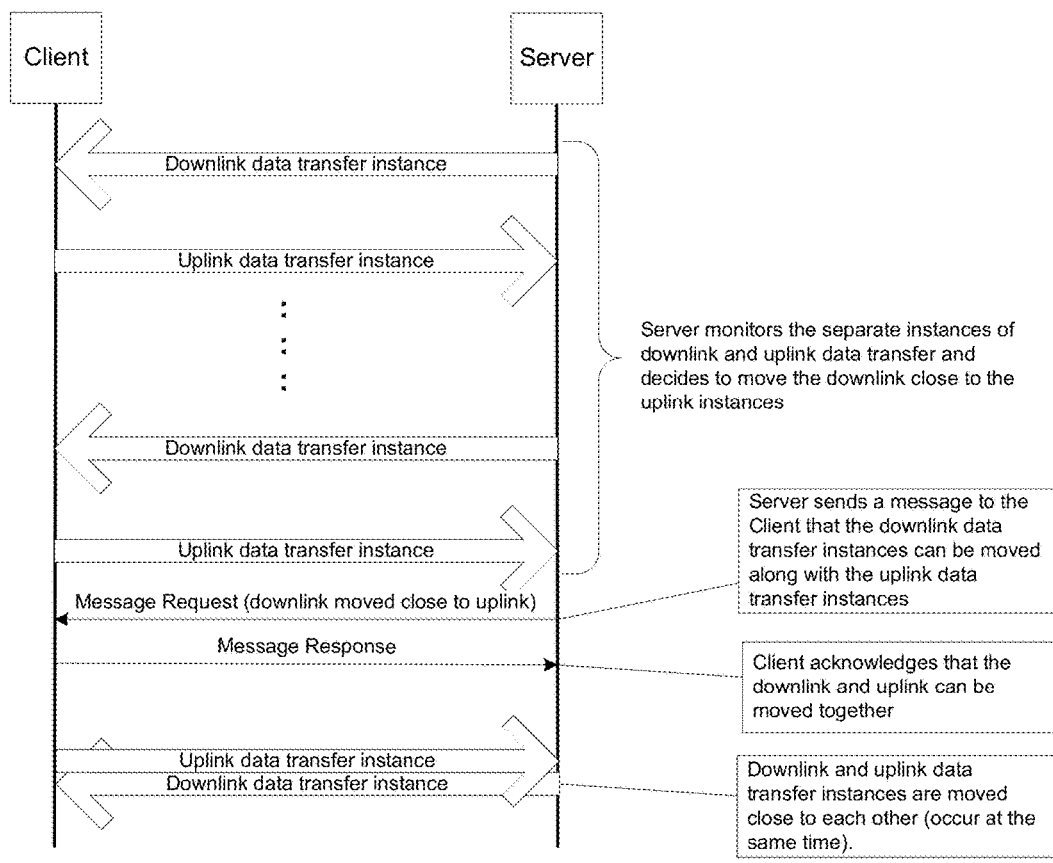
FIG. 7A illustrates a Server monitoring of uplink and downlink data transfer instances and initiating message exchange with the Client to move the downlink data transfer instances towards the uplink data transfer instances according to the aspects of the present disclosure.
Figure 7B:
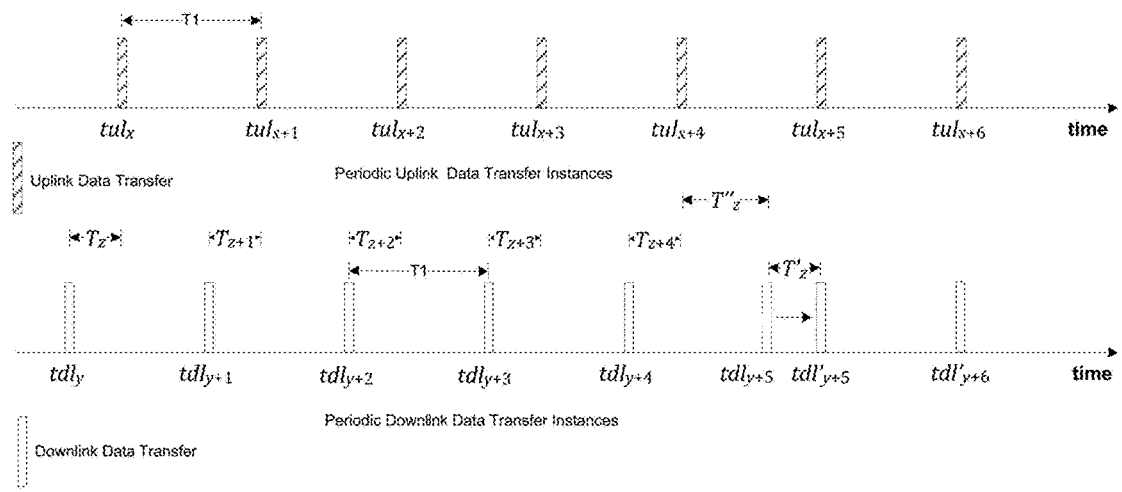
FIG. 7B illustrates delaying of the downlink data transfer instances close to or overlap with uplink data transfer instances according to the aspects of the present disclosure.

According to an aspect of the present disclosure, the Server may compare $T'_z$ and $T''_z$. If $T'_z < T''_z$ then the Server may decide to delay $tdl_{y+n}$ to $tdl'_{y+n}$ where $tdl'_{y+n} = (tdl_{y+n} + T'_z)$. According to an aspect of the present disclosure, the Server may initiate the resource re-allocation process as shown in FIG. 7A by sending a Message Request to the Client indicating that the timing of the downlink data transfer instances may be aligned close to the uplink data transfer instances or overlap with the uplink data transfer instances of the Client. The Client may send an acknowledgement using Message Response to the Server. According to an aspect of the present disclosure, starting from the downlink data transfer instance $tdl'_{y+n}$ the Server may allocate all further downlink data transfer instances at time interval T1 relative to $tdl'_{y+n}$. This ensures that the downlink data transfer and the uplink data transfer instances are overlapped starting from the downlink data transfer instance $tdl'_{y+n}$. An example of the resource reallocation such that both uplink data transfer and the downlink data transfer instances overlap is shown in FIG. 7B. In this example, n is chosen to be five. According to an aspect of the present disclosure, if $T'_z \geq T''_z$ then the Server checks if the downlink data transfer at $tdl_{y+n}$ can be advanced to $tdl''_{y+n}$ where $tdl''_{y+n} = (tdl_{y+n} - T''_z)$. If it can be advanced then the Server may advance the downlink data transfer to $tdl''_{y+n}$. An example of the resource reallocation such that both uplink data transfer and the downlink data transfer instances overlap is shown in FIG. 7C. In this example n is chosen to be five. According to an aspect of the present disclosure, if $tdl_{y+n}$ can not be advanced to $tdl''_{y+n}$ then the Server may delay the $tdl_{y+n}$ to $tdl'_{y+n}$. According to an aspect of the present disclosure, the Server's decision to move the $tdl_{y+n}$ to either $tdl'_{y+n}$ or $tdl''_{y+n}$ may depend on some of the QoS parameters such as delay, jitter, latency, etc. The parameter n may be configurable and it may be different for different type of applications. A suitable value for n may be determined by simulations and/or field data analysis.

Method 2: According to an aspect of the present disclosure, a Client may monitor the uplink data transfer instances and the downlink data transfer instances for n uplink data transfer and downlink data transfer instances. The uplink data transfer instances herein are referred to as $tul_x$, $tul_{x+1}$, $tul_{x+2}$, ..., $tul_{x+n-1}$. The downlink data transfer instances herein are referred to as $tdl_y$, $tdl_{y+1}$, $tdl_{y+2}$, ..., $tdl_{y+n-1}$. According to an aspect of the present disclosure, the Client may calculate the time difference between every downlink data transfer and uplink data transfer instance pairs using EQ. (3):

$$T_z = |tdl_y - tul_x| \qquad \text{EQ. (3)}$$

According to an aspect of the present disclosure, the Client may calculate $T_z$, $T_{z+1}$, $T_{z+2}$, ..., $T_{z+n-1}$, using EQ. (3). According to an aspect of the present disclosure, the Client may estimate the mean time difference $T'_z$ from the calculated time differences $T_z, T_{z+1}, T_{z+2}, \ldots, T_{z+n-1}$. The Client may find a pattern that the individual time differences $T_z, T_{z+1}, T_{z+2}, \ldots, T_{z+n-1}$ are approximately the same as that of the mean value $T'_z$. According to an aspect of the present disclosure, the Client may determine that the individual time differences $T_z, T_{z+1}, T_{z+2}, \ldots, T_{z+n-1}$ are approximately the same as that of the mean value $T'_z$ if the individual time differences are within a configurable threshold C1 of the mean value.

For a periodic downlink data transfer and uplink data transfer, let T1 denote the time duration between two consecutive uplink data transfers and two consecutive downlink data transfers. According to an aspect of the present disclosure, the Client may calculate difference between T1 and $T'_z$ using EQ. (4):

$$T''_z = |T1 - T'_z| \qquad \text{EQ. (4)}$$

Figure 8A:
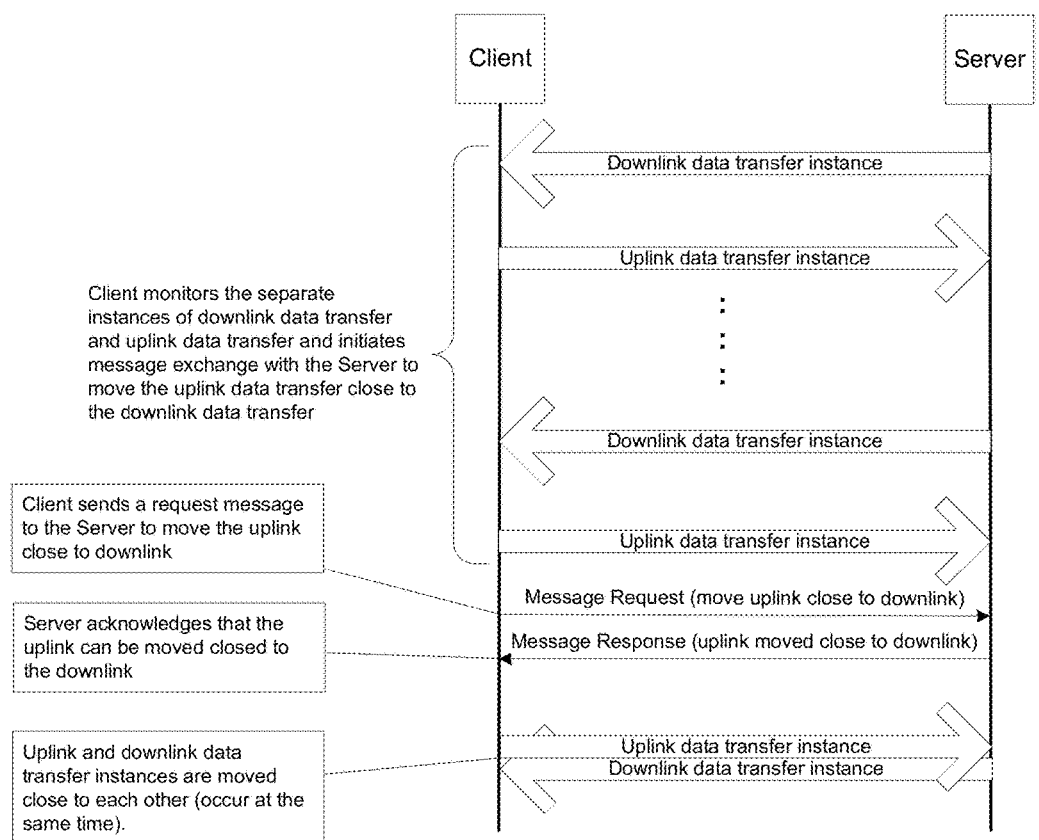
FIG. 8A illustrates a Client monitoring of uplink and downlink data transfer instances and the Client initiating message exchange with the Server to move the uplink data transfer instances towards the downlink data transfer instances according to the aspects of the present disclosure.
Figure 8B:
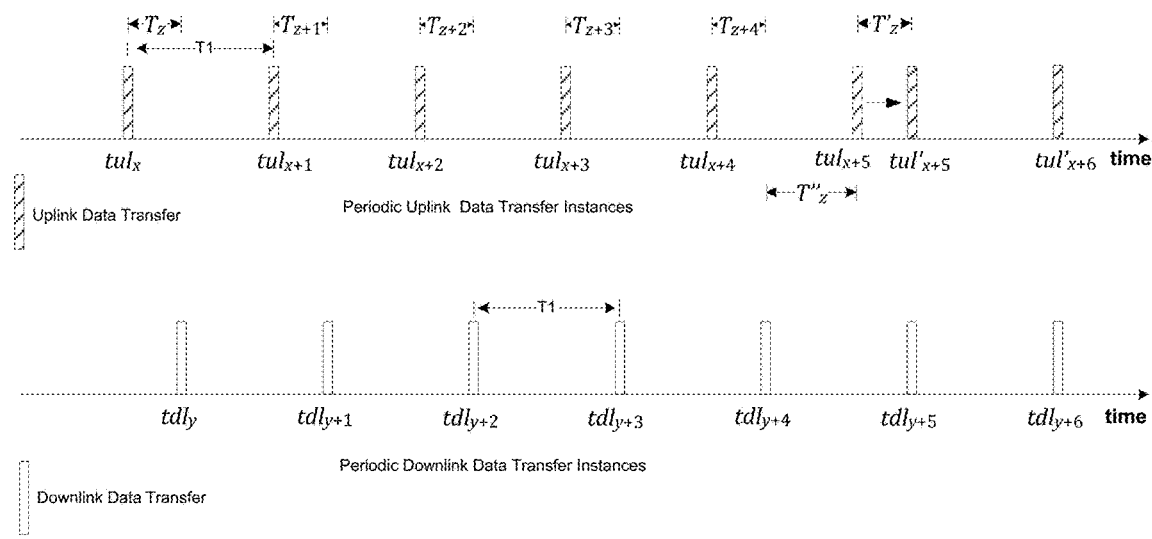
FIG. 8B illustrates delaying of the uplink data transfer instances close to or overlap with downlink data transfer instances according to the aspects of the present disclosure.
Figure 8C:
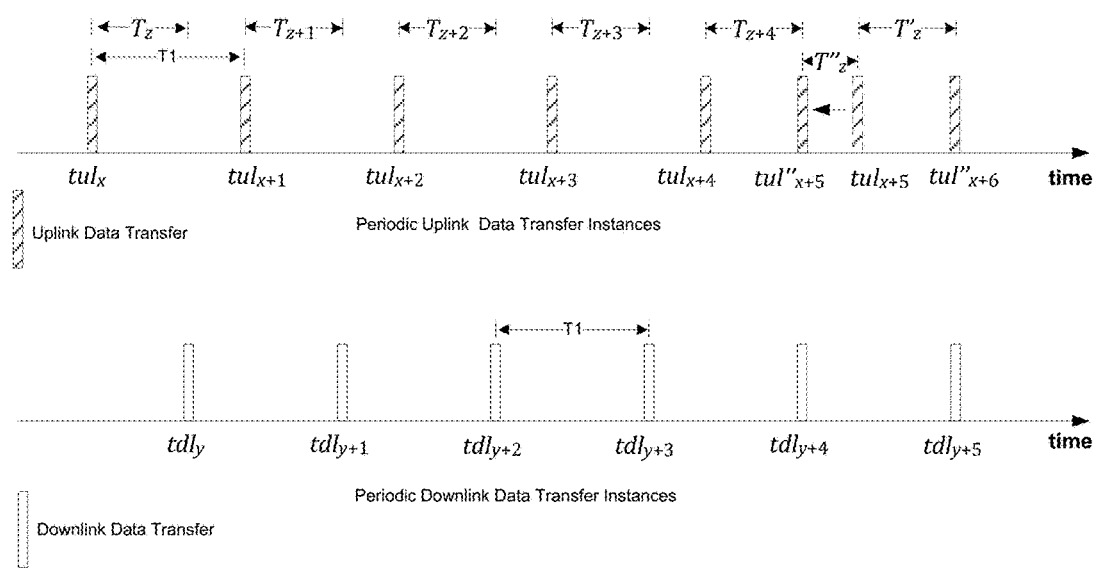
FIG. 8C illustrates advancing of the uplink data transfer instances to overlap with downlink data transfer instances according to the aspects of the present disclosure.

According to an aspect of the present disclosure, the Client may compare $T'_z$ and $T''_z$. According to an aspect of the present disclosure, if $T'_z < T''_z$ then the Client may decide to delay $tul_{y+n}$ to $tul'_{y+n}$ where $tul'_{y+n} = (tul_{y+n} + T'_z)$. According to an aspect of the present disclosure, the Client may initiate the resource re-allocation process as shown in FIG. 8A by sending a Message Request to the Server requesting to align the timings of the uplink data transfer instances close to the downlink data transfer timings or overlap with the downlink data transfer instances of the Server. According to an aspect of the present disclosure, a Client may request the Server to reallocate the resources such that uplink data transfer instance $tul_{y+n}$ is delayed to $tul'_{y+n}$. The Server may send an acknowledgement using Message Response to the Client indicating that the uplink data transfer instances may be moved close to the downlink data transfer instances or overlap with the downlink data transfer instances of the Server. According to an aspect of the present disclosure, starting from the uplink data transfer instance $tul'_{y+n}$, the Server may allocate all further uplink data transfer instances at time interval T1 relative to $tul'_{y+n}$. This may ensure that the uplink data transfer and the downlink data transfer instances are overlapped starting from the uplink data transfer instance $tul'_{y+n}$. An example of the resource reallocation such that both uplink data transfer and the downlink data transfer instances overlap is shown in FIG. 8B. In this example n is chosen to be five. According to an aspect of the present disclosure, if $T'_z \geq T''_z$ then the Client may check if the uplink data transfer at $tul_{y+n}$ can be advanced to $tul''_{y+n}$ where $tul''_{y+n} = (tul_{y+n} - T''_z)$. If it can be advanced then the Client may request the Server to reallocate the resources such that uplink data transfer instance $tul_{y+n}$ is advanced to $tul''_{y+n}$. An example of the resource reallocation such that both uplink data transfer and the downlink data transfer instances overlap is shown in FIG. 8C. In this example n is chosen to be five. According to an aspect of the present disclosure, if $tul_{y+n}$ cannot be advanced to $tul''_{y+n}$ then the Client may request the Server to reallocate the resources such that uplink data transfer instance $tul_{y+n}$ is delayed to $tul'_{y+n}$. According to an aspect of the present disclosure, the Client's decision to move the $tul_{y+n}$ to either $tul'_{y+n}$ or $tul''_{y+n}$ may depend on some of the QoS parameters such as delay, jitter, latency, etc. The number n may be configurable and it may be different for different type of applications. A suitable value n may be determined by simulations and/or field data analysis.

In some communication systems, a client may have the uplink transmission resources available all the time. According to an aspect of the present disclosure, in such communication systems, the Client may autonomously either delay or advance the uplink data transfer instances such that they are aligned with the downlink data transfer instances without requesting and communicating to the server.

Figure 9:
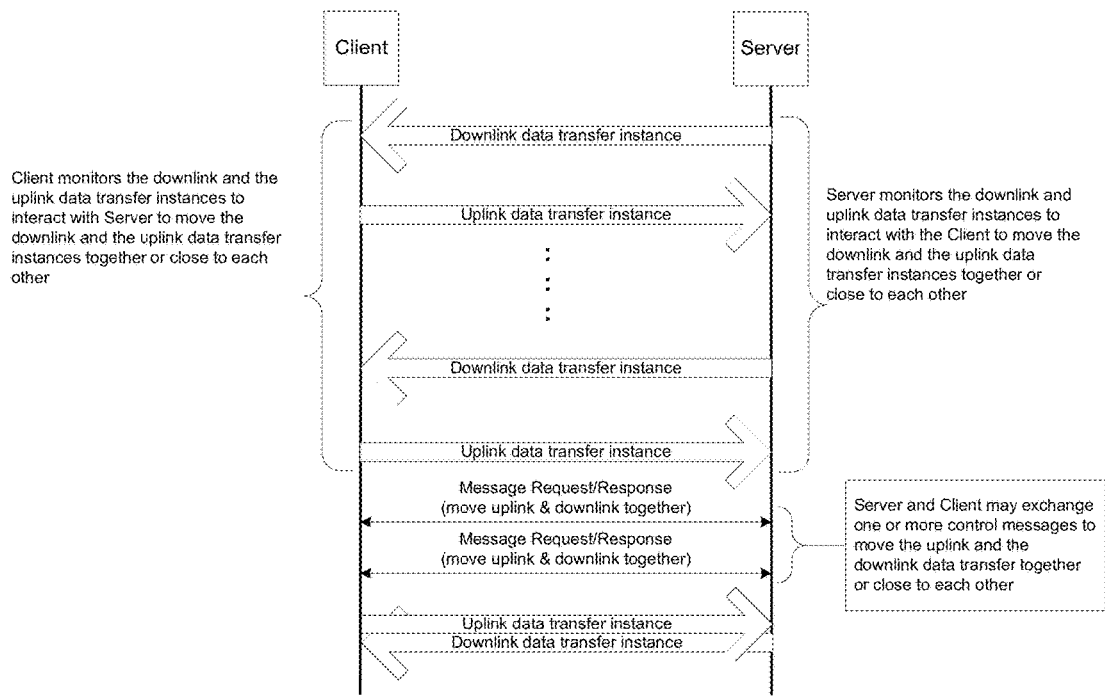
FIG. 9 illustrates both the Server and the Client monitoring the uplink and downlink data transfer instances and either the Server or the Client initiating the message exchange between the Server and the Client to move the uplink and the downlink data transfer instances close to or overlap with each other according to the aspects of the present disclosure.

Method 3: According to an aspect of the present disclosure, both the Server and the Client may monitor the timing of the uplink data transfer and the downlink data transfer instances. According to an aspect of the present disclosure, either the Server or the Client or both may initiate the resource re-allocation process as shown in FIG. 9 to move the uplink data transfer instances and/or the downlink data transfer instances close to each other or overlap with each other. According to an aspect of the present disclosure, both the uplink data transfer instances and the downlink data transfer instances may be moved such that the uplink data transfer instances are close to the downlink data transfer instances or overlap with the downlink data transfer instances while keeping the latency on both the uplink path and downlink path to a minimum.

The above described methods are few examples of monitoring and resource reallocation to move the uplink data transfer and the downlink data transfer instances to close to each other or overlap with each other. It is understood that there may be other methods to monitor and reallocate the resources to move the uplink and the downlink data transfer instances close to each other or overlap with each other so that both uplink data transfer and downlink data transfer may take place in a single active state of a client terminal.

The resource reallocation process may consider the associated Quality of service (QoS) requirement of the data transfer. Some of the QoS parameters such as delay, jitter, latency, etc. may be considered while reallocating the resources for the uplink and/or the downlink data transfer to move both the uplink and downlink data transfer instances close to each other or overlap without affecting the end user experience for that application. For example, the decision to advance or delay the timing of the data transfer instances may be based on the criterion of minimizing the delay.

Figure 6:
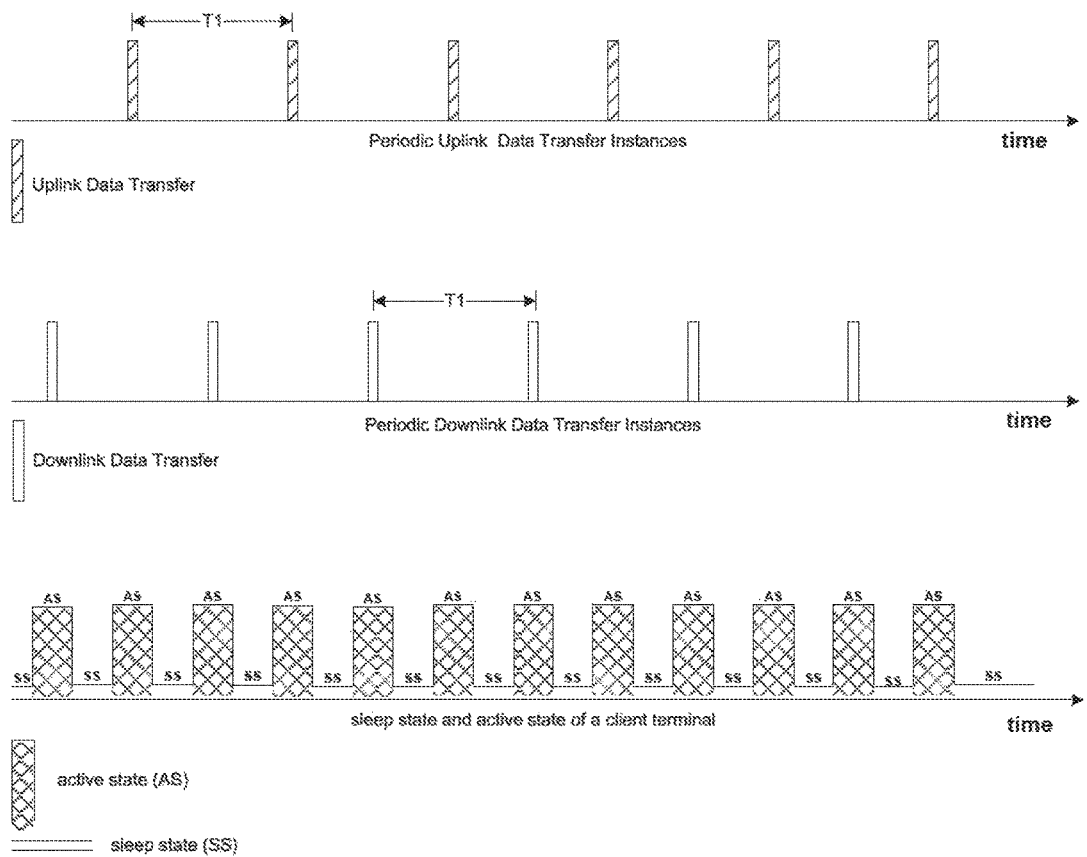
FIG. 6 illustrates separate uplink and downlink periodic data transfer instances and a corresponding sleep state and active state in a client terminal.
Figure 10:
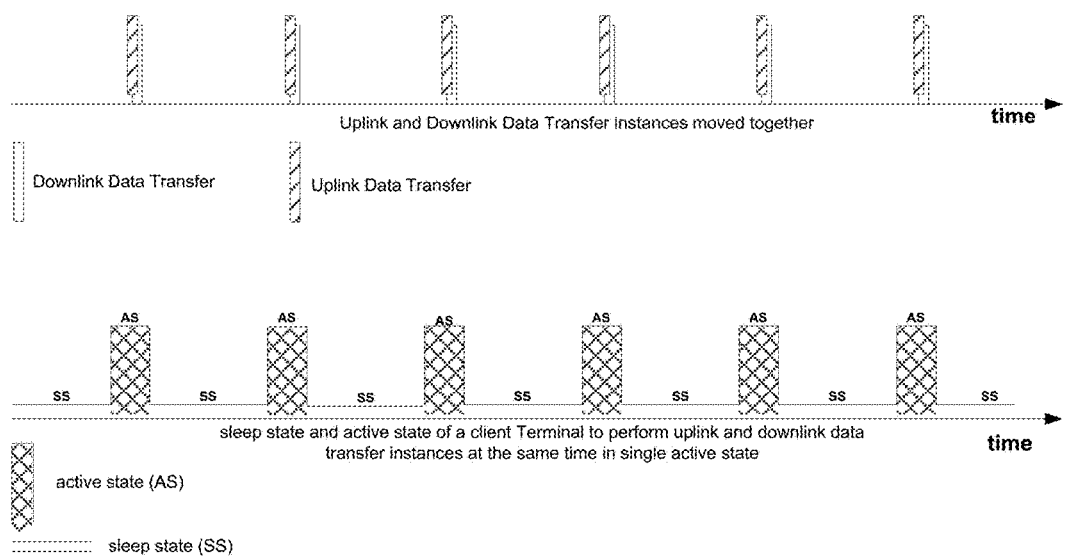
FIG. 10 illustrates the sleep state and active state of a client terminal after moving uplink and downlink data transfer instances close to or overlap with each other according to the aspects of the present disclosure.

The adaptation of resource allocation to move the uplink data transfer and the downlink data transfer instances to close to each other or overlap with each other may reduce the power consumption in a client terminal. In the best case scenario, the rate at which the client terminal enters into active state to perform uplink data transfer and downlink data transfer may be reduced to half as illustrated in FIG. 10. This may in turn significantly reduce power consumption in a client terminal as can be observed by comparing the prior art scenario illustrated in FIG. 6 with that of the scenario illustrated in FIG. 10 according to the aspects of the present disclosure.

Sometimes the uplink data transfer and the downlink data transfer may not be periodic or the uplink data transfer period may be different from that of the downlink data transfer period. In such cases even if only a subset of the uplink and downlink data transfer instances may be moved close to each other or overlapped with each other by adaptation of resource allocation, it still may significantly reduce the power consumption of the client terminal. According to an aspect of the present disclosure, in case of non-periodic data transfer, after initially making the uplink data transfer and the downlink data transfer aligned close to each other or overlapped with each other, the Client or the Server or both may continue to monitor the uplink data transfer and the downlink data transfer instances and may periodically reevaluate whether to continue the alignment or let the uplink data transfer and the downlink data transfer instances to be independent. This decision may be based on QoS criteria such as latency and jitter. According to another aspect of the present disclosure, the decision regarding whether to continue the alignment of uplink data transfer and the downlink data transfer instances or not may be made after applying hysteresis to the various metrics used in the decision making in order to ensure stable operation and avoid switching back and forth between aligned uplink data transfer and the downlink data transfer instances and unaligned uplink data transfer and the downlink data transfer instances.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The present disclosure is applied to a wireless communication system based on the 3GPP LTE standard for a Voice over Internet Protocol (VoIP) application. The aspects of the present disclosure may be used for any communication system where the uplink data transfer and downlink data transfer instances may not aligned for applications that require bidirectional data transfers.

Figure 11:
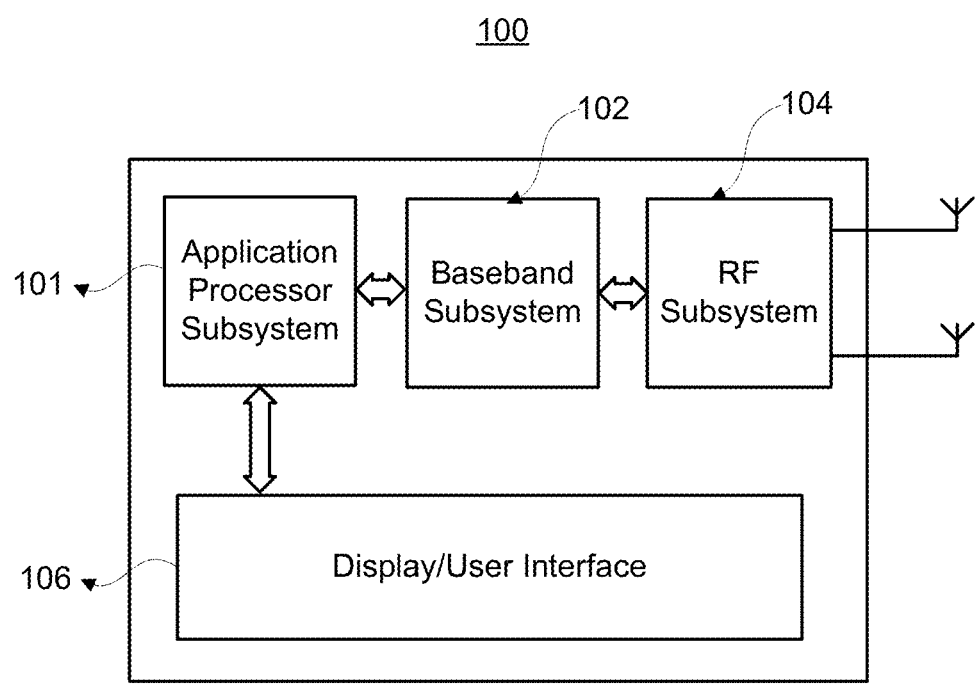
FIG. 11 illustrates a wireless mobile station diagram, which may be employed with aspects of the disclosure described herein.

By way of example only, the above-described method may be implemented in a receiver, e.g., a user device such as a wireless mobile station (MS) 100 as shown in FIG. 11.

As shown in FIG. 11, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 12:
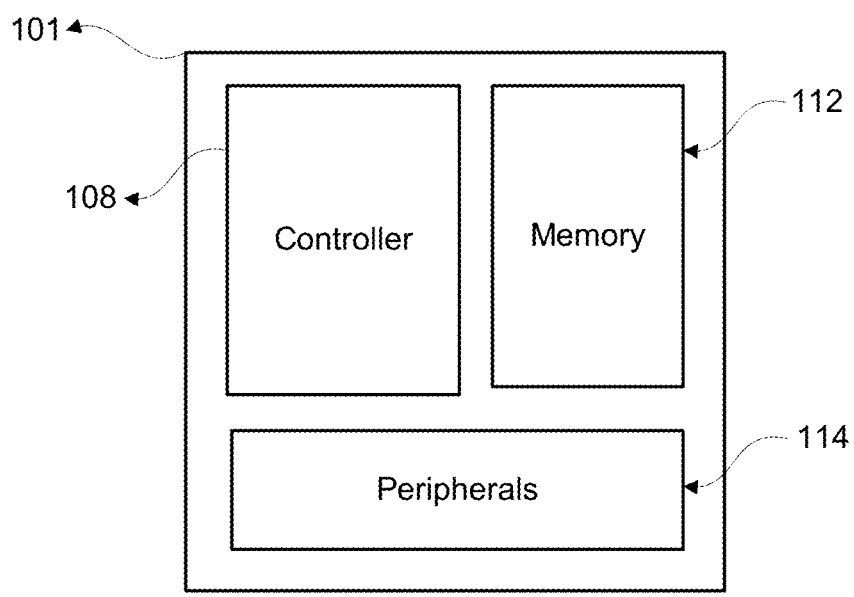
FIG. 12 illustrates an application processor subsystem for a wireless mobile station, which may be employed with aspects of the disclosure described herein.
Figure 13:
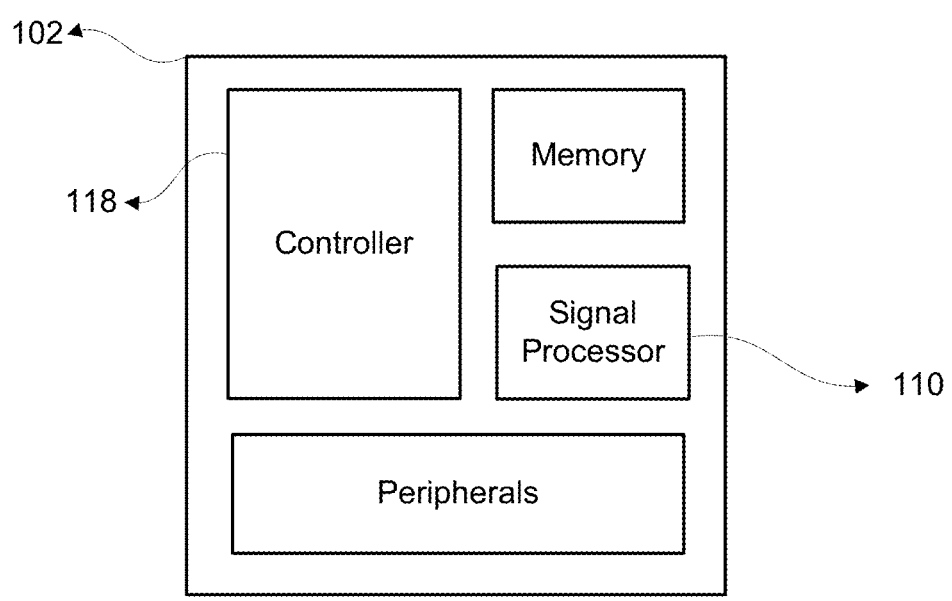
FIG. 13 illustrates a baseband subsystem for a wireless mobile station, which may be employed with aspects of the disclosure described herein.
Figure 14:
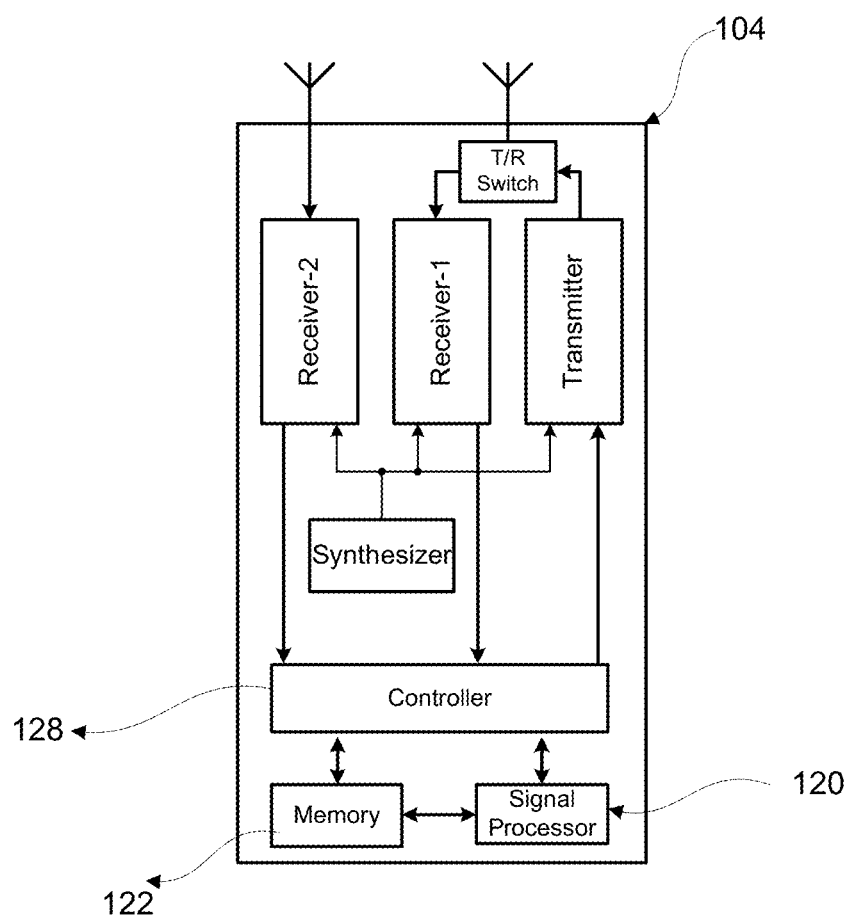
FIG. 14 illustrates a Radio Frequency (RF) subsystem for a wireless mobile station, which may be employed with aspects of the disclosure described herein.

The application processor subsystem 101 as shown in FIG. 12 may include a controller 108 such as a microcontroller, another processor or other circuitry. The baseband subsystem 102 as shown in FIG. 13 may include a controller 118 such as a microcontroller or other processor. The RF subsystem 104 as shown in FIG. 14 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

In FIG. 12, the Peripherals 114 such as a full or partial keyboard, video or still image display, audio interface, etc. may be employed and managed through the controller 108.

Aspects of the present disclosure may be implemented in firmware of the controller 108 of the application processor in FIG. 12 and/or the controller 118 of the baseband subsystem in FIG. 13. In another alternative, aspects of the present disclosure may also be implemented as a combination of firmware and hardware of the application processor subsystem 101 of FIG. 12 and/or the baseband subsystem 102 of FIG. 13. For instance, a signal processing entity of any or all of the FIG. 13 may be implemented in firmware, hardware and/or software. It may be part of the baseband subsystem, the receiver subsystem or be associated with both subsystems. In one example, the controller 118 and/or the signal processor 110 in FIG. 13 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use this disclosure may include smartphones, tablets, laptops, gaming consoles, cameras, video camcorders, TV, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for resource allocation between a server and a client device in a wireless communication system, the method comprising:

controlling, by at least one processing device of the server, monitoring uplink data transfer and downlink data transfer between the server and client device; and uplink data transfer instances and downlink data transfer instances to take place respectively in single active states of the client device, based on the monitoring, by:

determining a time difference, $T_z$, between every downlink data transfer and uplink data transfer instance pair of n uplink and downlink data transfer instances for which uplink data transfer timing and downlink data transfer timing are monitored during the monitoring, wherein $T_z=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_z$, from the time differences $T_z, T_{z+1}, T_{z+2}, \ldots, T_{z+n-1}$;

determining whether the individual time differences $T_z, T_{z+1}, T_{z+2}, \ldots, T_{z+n-1}$ are approximately the same as the mean time difference $T'_z$, based on whether the individual time differences are within a predetermined threshold C1 of the mean time difference $T'_z$;

when a periodic downlink data transfer and uplink data transfer is determined, determining a difference, $T''_z$, between a time duration between two consecutive uplink data transfer instances and two consecutive downlink data transfer instances, T1, and $T'_z$, where $T''_z=|T1-T'_z|$, when $T'_z<T''_z$ delaying a downlink data transfer instance at $tdl_{y+n}$ to a downlink data transfer instance at $tdl'_{y+n}$, wherein $tdl'_{y+n}=(tdl_{y+n}+T'_z)$, and when $T'_z \geq T''_z$ and (i) when the downlink data transfer instance at $tdl_{y+n}$ is determined to be advanceable to a downlink data transfer instance at $tdl''_{y+n}$, wherein $tdl''_{y+n}=(tdl_{y+n}-T''_z)$, advancing the downlink data transfer instance at $tdl_{y+n}$ to the downlink data transfer instance at $tdl''_{y+n}$, and (ii) when the downlink data transfer instance at $tdl_{y+n}$ is determined not to be advanceable to the downlink data transfer instance at $tdl''_{y+n}$, delaying the downlink data transfer instance at $tdl_{y+n}$ to the downlink data transfer instance at $tdl'_{y+n}$.

2. The method of claim 1, wherein the delaying the downlink data transfer instance at $tdl_{y+n}$ includes:

sending a message request to the client device indicating that timing of the downlink data transfer instances may be aligned close to, or overlap with, the uplink data transfer instances of the client device, and based on a response of an acknowledgement from the client device being received at the server, starting from the downlink data transfer instance at $tdl'_{y+n}$ allocating all subsequent downlink data transfer instances at time interval T1 relative to $tdl'_{y+n}$.

3. The method of claim 2, wherein whether the downlink data transfer instance at $tdl_{y+n}$ is determined to be advanceable to the downlink data transfer instance at $tdl''_{y+n}$ is based on a Quality of Service (QoS) parameter of at least one of delay, jitter or latency.

4. The method of claim 1, wherein n is equal to five.

5. The method of claim 1, wherein n is determined based on at least one of simulation or field data analysis.

6. The method of claim 1, wherein a first processing device of the client device and a second processing device of the server control the monitoring of the uplink data transfer and the downlink data transfer, wherein at least one of the first and second processing devices controls a resource re-allocation process to move at least one of second given uplink data transfer instances or second given downlink data transfer instances close to each other or to overlap with each other.

7. The method of claim 6, wherein the second given uplink data transfer instances and the second given downlink data transfer instances are moved such that the second given uplink data transfer instances are close to the second given downlink data transfer instances or overlap with the second given downlink data transfer instances and latency is minimized on both an uplink path and a downlink path.

8. The method of claim 6, wherein the resource re-allocation process is based on an associated Quality of service (QoS) requirement of data transfer, according to a QoS parameter of at least one of delay, jitter or latency.

9. The method of claim 6, further comprising:

controlling, by at least one of the first and second processing devices, deciding whether to advance or delay timing of the at least one of the second given uplink data transfer instances or the second given downlink data transfer instances based on a criterion of minimizing delay.

10. The method of claim 1, further comprising:

controlling, by the at least one processing device, when the uplink data transfer and the downlink data transfer is determined to be not periodic or an uplink data transfer period is determined to be different from a downlink data transfer period, a subset of the uplink and downlink data transfer instances to move close to each other or overlap with each other by adaptation of resource allocation.

11. A method for resource allocation between a server and a client device in a wireless communication system, the method comprising:

controlling, by at least one processing device of the client device, monitoring uplink data transfer and downlink data transfer between the server and client device; and uplink data transfer instances and downlink data transfer instances to take place respectively in single active states of the client device, based on the monitoring, by:

determining a time difference, $T_z$, between every downlink data transfer and uplink data transfer instance pair of n uplink and downlink data transfer instances for which uplink data transfer timing and downlink data transfer timing are monitored during the monitoring, wherein $T_z=|tdl_y-tul_x|$, $tdl_y$ is a given downlink data transfer instance of the n downlink data transfer instances and $tul_x$ is a given uplink data transfer instance of the n uplink data transfer instances;

determining a mean time difference, $T'_z$, from the time differences $T_z, T_{z+1}, T_{z+2}, \ldots, T_{z+n-1}$;

determining that the individual time differences $T_z$, $T_{z+1}, T_{z+2}, \ldots, T_{z+n-1}$ are approximately the same as the mean time difference $T'_z$, when the individual time differences are within a predetermined threshold C1 of the mean time difference $T'_z$;

when a periodic downlink data transfer and uplink data transfer is determined, determining a difference, $T''_z$, between a time duration between two consecutive uplink data transfer instances and two consecutive downlink data transfer instances, T1, and $T'_z$, where $T''_z=|T1-T'_z|$, when $T'_z<T''_z$, delaying an uplink data transfer instance at $tul_{y+n}$ to an uplink data transfer instance $tul'_{y+n}$ where $tul'_{y+n}=(tul_{y+n}+T'_z)$, and when $T'_z \geq T''_z$ and (i) when the uplink data transfer instance at $tul_{y+n}$ is determined to be advanceable to an uplink data transfer instance at $tul''_{y+n}$, wherein $tul''_{y+n}=(tul_{y+n}-T''_z)$, requesting the server to advance the uplink data transfer instance at $tul_{y+n}$ to the uplink data transfer instance at $tul''_{y+n}$, and (ii) when the uplink data transfer instance at $tul_{y+n}$ is determined not to be advanceable to the uplink data transfer instance at $tul''_{y+n}$, requesting the server to delay the uplink data transfer instance at $tul_{y+n}$ to the uplink data transfer instance at $tul'_{y+n}$.

12. The method of claim 11, wherein the delaying the uplink data transfer instance at $tul_{y+n}$ includes:

sending a message request to the server indicating that timing of the downlink data transfer instances may be aligned close to, or overlap with, the uplink data transfer instances of the server, and based on a response of an acknowledgement from the server being received at the client device, starting from the uplink data transfer instance at $tul'_{y+n}$ allocating all subsequent uplink data transfer instances at time interval T1 relative to $tul'_{y+n}$.

13. The method of claim 11, wherein whether the uplink data transfer instance at $tdl_{y+n}$ is determined to be advanceable to the uplink data transfer instance at $tul_{y+n}$ is based on a Quality of Service (QoS) parameter of at least one of delay, jitter or latency.

14. The method of claim 11, further comprising:
    when the client device is determined to have uplink a transmission resource available all the time, controlling by the at least one processing device, autonomously delaying or advancing the uplink data transfer instances to be aligned with corresponding ones of the downlink data transfer instances without communication with the server.

15. A method for resource allocation between a server and a client device in a wireless communication system, the method comprising:
    controlling, by at least one processing device of at least one of the server or the client device,
        monitoring uplink data transfer and downlink data transfer between the server and client device;
        uplink data transfer instances and downlink data transfer instances to take place respectively in single active states of the client device, based on the monitoring;
        when the uplink data transfer and the downlink data transfer is determined to be not periodic or an uplink data transfer period is determined to be different from a downlink data transfer period, a subset of the uplink and downlink data transfer instances to move close to each other or overlap with each other by adaptation of resource allocation; and
    when a non-periodic data transfer is determined, after the uplink data transfer and the downlink data transfer are controlled to be aligned close to each other or overlapped with each other, monitoring the uplink data transfer and the downlink data transfer instances and periodically reevaluating whether to continue alignment or allow the uplink data transfer and the downlink data transfer instances to be independent.

16. The method of claim 15, wherein a decision whether to continue the alignment or allow the uplink data transfer and the downlink data transfer instances to be independent is based on Quality of Service (QoS) criteria including at least one of latency or jitter.

17. The method of claim 16, wherein the decision whether to continue the alignment of the uplink data transfer and the downlink data transfer is made after applying hysteresis to at least one metric used in the decision making.

18. An apparatus for resource allocation between a server and a client device in a wireless communication system, the apparatus comprising:
    circuitry configured to control, at the server:
        monitoring uplink data transfer and downlink data transfer between the server and client device; and
        uplink data transfer instances and downlink data transfer instances to take place respectively in single active states of the client device, based on the monitoring, by:
            determining a time difference, $T_z$, between every downlink data transfer and uplink data transfer instance pair of n uplink and downlink data transfer instances for which uplink data transfer timing and downlink data transfer timing are monitored during the monitoring, wherein $T_z=|tdl_y-tul_x|$, $tdl_y$ is a given downlink data transfer instance of the n downlink data transfer instances and $tul_x$ is a given uplink data transfer instance of the n uplink data transfer instances;
            determining a mean time difference, $T'_z$, from the time differences $T_z, T_{z+1}, T_{z+2}, \ldots, T_{z+n-1}$;
            determining whether the individual time differences $T_z, T_{z+1}, T_{z+2}, \ldots, T_{z+n-1}$ are approximately the same as the mean time difference $T'_z$, based on whether the individual time differences are within a predetermined threshold C1 of the mean time difference $T'_z$;
            when a periodic downlink data transfer and uplink data transfer is determined,
            determining a difference, $T''_z$, between a time duration between two consecutive uplink data transfer instances and two consecutive downlink data transfer instances, T1, and $T'_z$, where $T''_z=|T1-T'_z|$,
            when $T'_z<T''_z$ delaying a downlink data transfer instance at $tdl_{y+n}$ to a downlink data transfer instance at $tdl'_{y+n}$, wherein $tdl'_{y+n}=(tdl_{y+n}+T'_z)$, and
            when $T'_z \geq T''_z$ and
                (i) when the downlink data transfer instance at $tdl_{y+n}$ is determined to be advanceable to a downlink data transfer instance at $tdl''_{y+n}$, wherein $tdl''_{y+n}=(tdl_{y+n}-T''_z)$, advancing the downlink data transfer instance at $tdl_{y+n}$ to the downlink data transfer instance at $tdl''_{y+n}$, and
                (ii) when the downlink data transfer instance at $tdl_{y+n}$ is determined not to be advanceable to the downlink data transfer instance at $tdl''_{y+n}$, delaying the downlink data transfer instance at $tdl_{y+n}$ to the downlink data transfer instance at $tdl'_{y+n}$.

19. A wireless communication device comprising:
    a receiver to receive a wireless communication; and
    a processing device configured for resource allocation between the wireless communication device as a server and a client device in a wireless communication system,
    wherein the processing device is configured to control:
        monitoring uplink data transfer and downlink data transfer between the server and client device; and
        uplink data transfer instances and downlink data transfer instances to take place respectively in single active states of the client device, based on the monitoring, by:
            determining a time difference, $T_z$, between every downlink data transfer and uplink data transfer instance pair of n uplink and downlink data transfer instances for which uplink data transfer timing and downlink data transfer timing are monitored during the monitoring, wherein $T_z=|tdl_y-tul_x|$, $tdl_y$ is a given downlink data transfer instance of the n downlink data transfer instances and $tul_x$ is a given uplink data transfer instance of the n uplink data transfer instances;
            determining a mean time difference, $T'_z$, from the time differences $T_z, T_{z+1}, T_{z+2}, \ldots, T_{z+n-1}$;
            determining whether the individual time differences $T_z, T_{z+1}, T_{z+2}, \ldots, T_{z+n-1}$ are approximately the same as the mean time difference $T'_z$, based on whether the individual time differences are within a predetermined threshold C1 of the mean time difference $T'_z$;
            when a periodic downlink data transfer and uplink data transfer is determined,
            determining a difference, $T''_z$, between a time duration between two consecutive uplink data transfer instances and two consecutive downlink data transfer instances, T1, and T'$_z$, where T''$_z$=|T1−T'$_z$|, when T'$_z$<T''$_z$ delaying a downlink data transfer instance at tdl$_{y+n}$ to a downlink data transfer instance at tdl'$_{y+n}$, wherein tdl'$_{y+n}$=(tdl$_{y+n}$+T'$_z$), and when T'$_z$≥T''$_z$ and
(i) when the downlink data transfer instance at tdl$_{y+n}$ is determined to be advanceable to a downlink data transfer instance at tdl''$_{y+n}$, wherein tdl''$_{y+n}$=(tdl$_{y+n}$−T'$_z$), advancing the downlink data transfer instance at tdl$_{y+n}$ to the downlink data transfer instance at tdl''$_{y+n}$, and
(ii) when the downlink data transfer instance at tdl$_{y+n}$ is determined not to be advanceable to the downlink data transfer instance at tdl''$_{y+n}$, delaying the downlink data transfer instance at tdl$_{y+n}$ to the downlink data transfer instance at tdl'$_{y+n}$.

20. An apparatus for resource allocation between a server and a client device in a wireless communication system, the apparatus comprising:
circuitry configured to control, at the client device:
monitoring uplink data transfer and downlink data transfer between the server and client device; and
uplink data transfer instances and downlink data transfer instances to take place respectively in single active states of the client device, based on the monitoring, by:
determining a time difference, T$_z$, between every downlink data transfer and uplink data transfer instance pair of n uplink and downlink data transfer instances for which uplink data transfer timing and downlink data transfer timing are monitored during the monitoring, wherein T$_z$=|tdl$_y$−tul$_x$|, tdl$_y$ is a given downlink data transfer instance of the n downlink data transfer instances and tul$_x$ is a given uplink data transfer instance of the n uplink data transfer instances;
determining a mean time difference, T'$_z$, from the time differences T$_z$, T$_{z+1}$, T$_{z+2}$, . . . , T$_{z+n-1}$;
determining whether the individual time differences T$_z$, T$_{z+1}$, T$_{z+2}$, . . . , T$_{z+n-1}$ are approximately the same as the mean time difference T'$_z$, when the individual time differences are within a predetermined threshold C1 of the mean time difference T'$_z$;
when a periodic downlink data transfer and uplink data transfer is determined,
determining a difference, T''$_z$, between a time duration between two consecutive uplink data transfer instances and two consecutive downlink data transfer instances, T1, and T'$_z$, where T''$_z$=|T1−T'$_z$|,
when T'$_z$<T''$_z$ delaying an uplink data transfer instance at tul$_{y+n}$ to an uplink data transfer instance at tul'$_{y+n}$ where tul'$_{y+n}$=(tul$_{y+n}$+T'$_z$), and
when T'$_z$≥T''$_z$ and
(i) when the uplink data transfer instance at tul$_{y+n}$ is determined to be advanceable to a uplink data transfer instance at tul''$_{y+n}$, wherein tul''$_{y+n}$=(tul$_{y+n}$−T'$_z$), requesting the server to advance the uplink data transfer instance at tul$_{y+n}$ to the uplink data transfer instance at tul''$_{y+n}$, and
(ii) when the uplink data transfer instance at tul$_{y+n}$ is determined not to be advanceable to the uplink data transfer instance at tul''$_{y+n}$, requesting the server to delay the uplink data transfer instance at tul'$_{y+n}$ to the uplink data transfer instance at tul'$_{y+n}$.

21. An apparatus for resource allocation between a server and a client device in a wireless communication system, the apparatus comprising:
circuitry at the server or the client device configured to control:
monitoring uplink data transfer and downlink data transfer between the server and client device;
uplink data transfer instances and downlink data transfer instances to take place respectively in single active states of the client device, based on the monitoring;
when the uplink data transfer and the downlink data transfer is determined to be not periodic or an uplink data transfer period is determined to be different from a downlink data transfer period, a subset of the uplink and downlink data transfer instances to move close to each other or overlap with each other by adaptation of resource allocation; and
when a non-periodic data transfer is determined, after the uplink data transfer and the downlink data transfer are controlled to be aligned close to each other or overlapped with each other, monitoring the uplink data transfer and the downlink data transfer instances and periodically reevaluating whether to continue alignment or allow the uplink data transfer and the downlink data transfer instances to be independent.

22. A wireless communication device comprising:
a receiver to receive a wireless communication; and
a processing device configured for resource allocation between the wireless communication device as a client device and a server in a wireless communication system,
wherein the processing device is configured to control:
monitoring uplink data transfer and downlink data transfer between the server and client device; and
uplink data transfer instances and downlink data transfer instances to take place respectively in single active states of the client device, based on the monitoring, by:
determining a time difference, T$_z$, between every downlink data transfer and uplink data transfer instance pair of n uplink and downlink data transfer instances for which uplink data transfer timing and downlink data transfer timing are monitored during the monitoring, wherein T$_z$=|tdl$_y$−tul$_x$|, tdl$_y$ is a given downlink data transfer instance of the n downlink data transfer instances and tul$_x$ is a given uplink data transfer instance of the n uplink data transfer instances;
determining a mean time difference, T'$_z$, from the time differences T$_z$, T$_{z+1}$, T$_{z+2}$, . . . , T$_{z+n-1}$;
determining whether the individual time differences T$_z$, T$_{z+1}$, T$_{z+2}$, . . . , T$_{z+n-1}$ are approximately the same as the mean time difference T'$_z$, when the individual time differences are within a predetermined threshold C1 of the mean time difference T'$_z$;
when a periodic downlink data transfer and uplink data transfer is determined,
determining a difference, T''$_z$, between a time duration between two consecutive uplink data transfer instances and two consecutive downlink data transfer instances, T1, and $T'_z$, where $T''_z=|T1-T'_z|$, when $T'_z<T''_z$ delaying an uplink data transfer instance at $tul_{y+n}$ to an uplink data transfer instance at $tul'_{y+n}$ where $tul'_{y+n}=(tul_{y+n}+T'_z)$, and when $T'_z \geq T''_z$ and (i) when the uplink data transfer instance at $tul_{y+n}$ is determined to be advanceable to a uplink data transfer instance at $tul''_{y+n}$, wherein $tul''_{y+n}=(tul_{y+n}-T''_z)$, requesting the server to advance the uplink data transfer instance at $tul_{y+n}$ to the uplink data transfer instance at $tul''_{y+n}$, and (ii) when the uplink data transfer instance at $tul_{y+n}$ is determined not to be advanceable to the uplink data transfer instance at $tul''_{y+n}$, requesting the server to delay the uplink data transfer instance at $tul'_{y+n}$ to the uplink data transfer instance at $tul'_{y+n}$.

23. A wireless communication device comprising:

a receiver to receive a wireless communication; and a processing device configured for resource allocation between a client device and a server in a wireless communication system, wherein the processing device is configured to control, at the server or the client device as the wireless communication device:

monitoring uplink data transfer and downlink data transfer between the server and client device;

uplink data transfer instances and downlink data transfer instances to take place respectively in single active states of the client device, based on the monitoring;

when the uplink data transfer and the downlink data transfer is determined to be not periodic or an uplink data transfer period is determined to be different from a downlink data transfer period, a subset of the uplink and downlink data transfer instances to move close to each other or overlap with each other by adaptation of resource allocation; and when a non-periodic data transfer is determined, after the uplink data transfer and the downlink data transfer are controlled to be aligned close to each other or overlapped with each other, monitoring the uplink data transfer and the downlink data transfer instances and periodically reevaluating whether to continue alignment or allow the uplink data transfer and the downlink data transfer instances to be independent.

* * * * *